United States Patent
Bhowmik

(10) Patent No.: US 6,268,666 B1
(45) Date of Patent: Jul. 31, 2001

(54) BI-DIRECTIONAL POWER CONVERSION APPARATUS FOR COMBINATION OF ENERGY SOURCES

(75) Inventor: Shibashis Bhowmik, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/257,308

(22) Filed: Feb. 25, 1999

(51) Int. Cl.[7] ................................................ H02M 3/335
(52) U.S. Cl. .......................... 307/72; 363/101; 323/259; 323/271; 323/282; 323/284; 323/350; 323/351
(58) Field of Search ............................. 307/72; 323/271, 323/282, 284, 350, 351, 259; 363/101, 26, 21

(56) References Cited

U.S. PATENT DOCUMENTS

| | | | |
|---|---|---|---|
| 4,186,437 | 1/1980 | Cuk | 363/65 |
| 4,578,630 | * 3/1986 | Grosch | 323/351 |
| 4,736,151 | 4/1988 | Dishner | 323/224 |
| 4,743,812 | 5/1988 | Dishner | 318/14 |
| 5,027,264 | 6/1991 | DeDoncker et al. | 363/16 |
| 5,047,913 | 9/1991 | DeDoncker et al. | 363/95 |
| 5,070,294 | 12/1991 | Nochi | 323/267 |
| 5,181,169 | * 1/1993 | Murugan | 363/26 |
| 5,255,174 | 10/1993 | Murugan | 363/71 |
| 5,287,261 | 2/1994 | Ehsani | 363/124 |
| 5,359,280 | * 10/1994 | Canter et al. | 323/259 |
| 5,373,195 | 12/1994 | De Doncker et al. | 307/45 |
| 5,420,497 | 5/1995 | Kimura et al. | 323/224 |
| 5,623,398 | 4/1997 | Beach et al. | 363/65 |
| 5,636,108 | 6/1997 | Taurand | 363/20 |
| 5,654,881 | 8/1997 | Albrecht et al. | 363/25 |
| 5,671,128 | 9/1997 | Nakamura et al. | 363/16 |
| 6,069,804 | * 5/2000 | Ingman et al. | 363/21 |

* cited by examiner

Primary Examiner—Albert W. Paladini
(74) Attorney, Agent, or Firm—Gunn, Lee & Keeling

(57) ABSTRACT

A bi-directional power converter apparatus and method of conversion is disclosed which comprises three active elements (output, primary, and auxiliary switches) and two passive components (primary and auxiliary energy storage elements) coupled so as to enable operation in any one of several different power conversion modes, including: a Non-Assisted Generation mode, a Super-Assisted Generation mode, a Super-Assisted Regeneration mode, an Auxiliary Generation mode, and an Output Regeneration mode. The individual components operate in a synergistic fashion to enable the free, bi-directional, transfer of power from primary and auxiliary energy sources to a load, and from the load to the primary and auxiliary energy sources. Further, the invention operates in such a way as to dramatically reduce the effective boost/buck ratios required for low voltage energy sources connected to a high voltage output power bus.

25 Claims, 12 Drawing Sheets

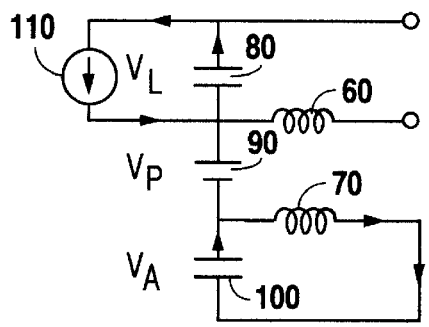
Fig. 3G1
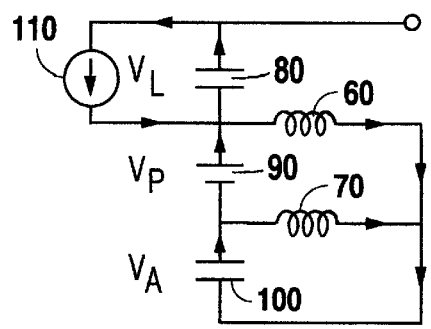
Fig. 3G2
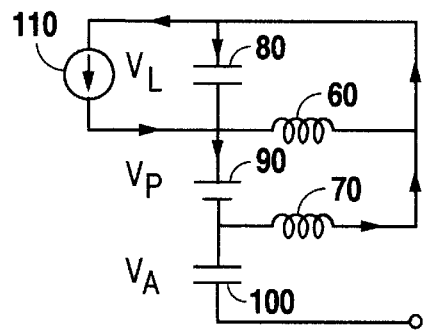
Fig. 3G3
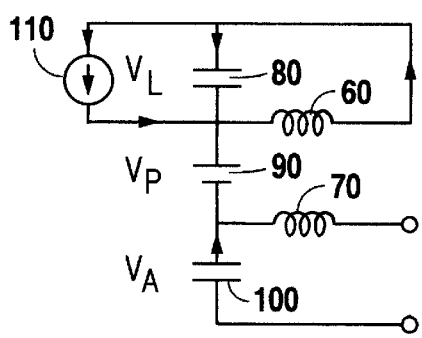
Fig. 3G4
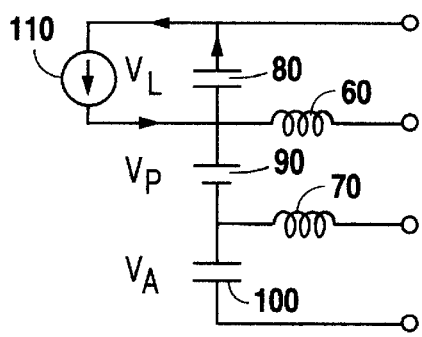
Fig. 3G5
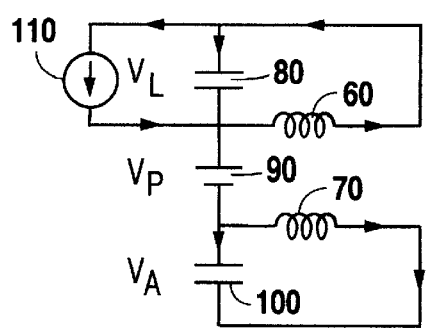
Fig. 3G6
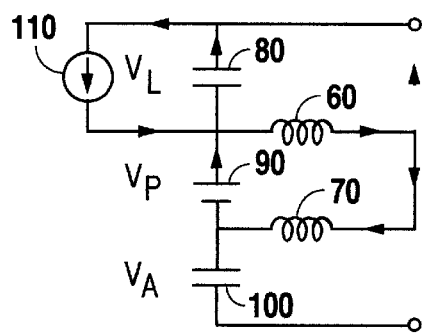
Fig. 3G7
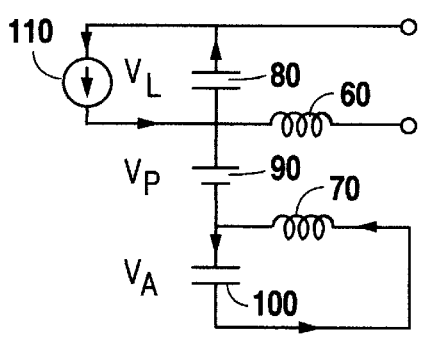
Fig. 3G8

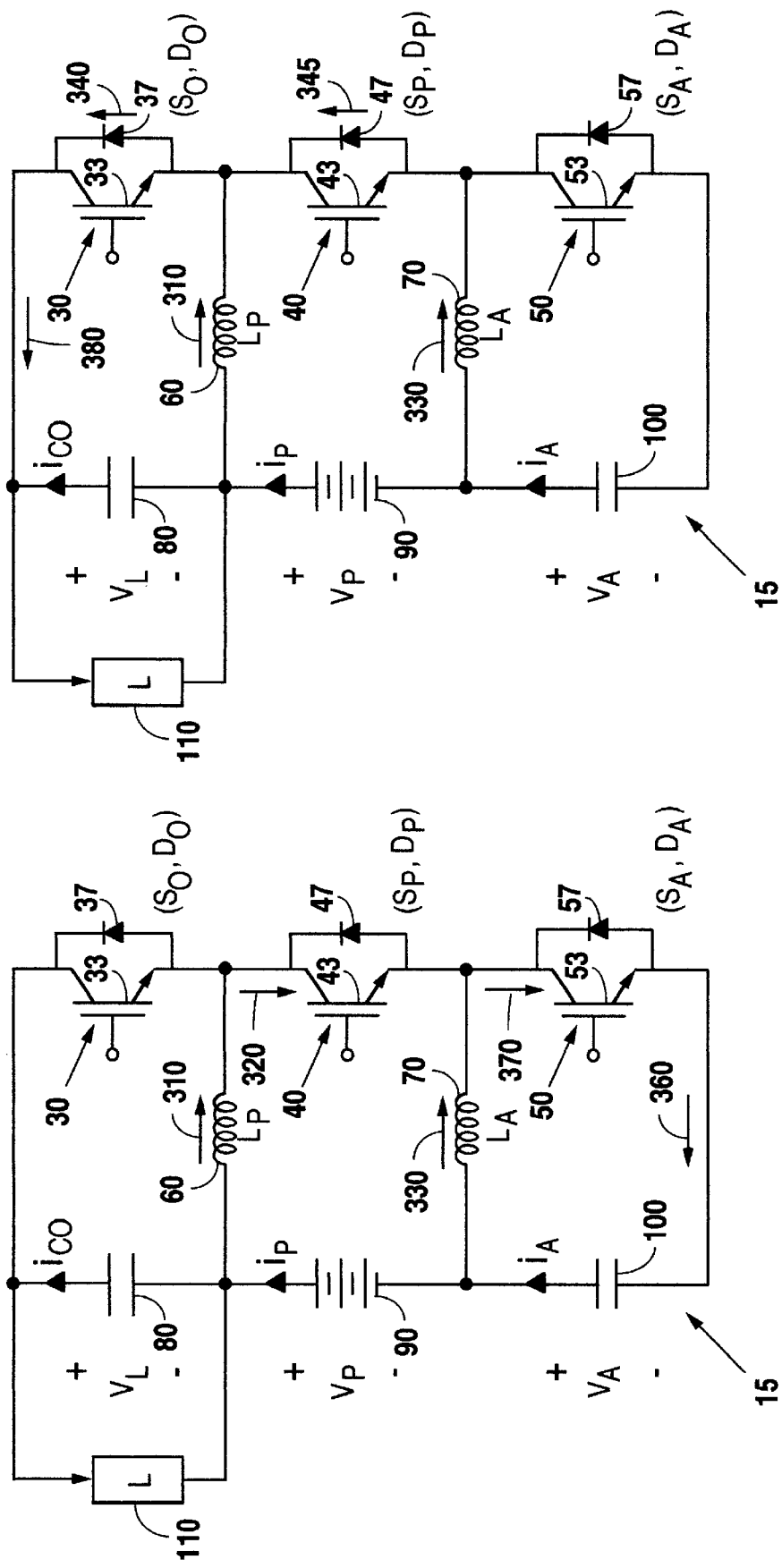

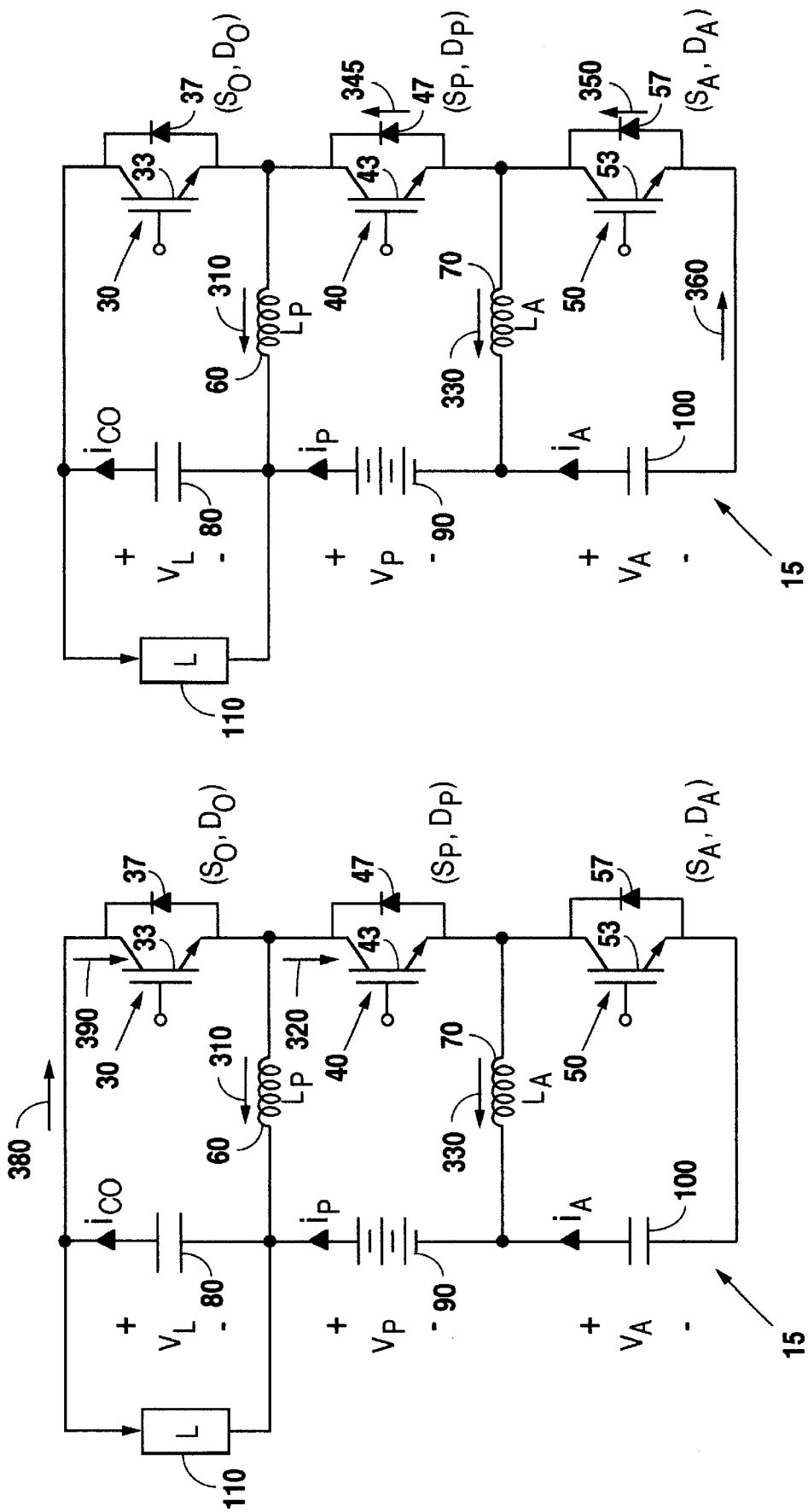

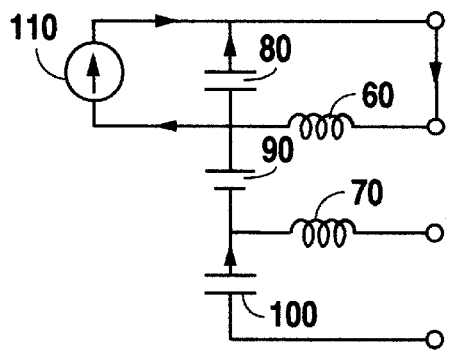
Fig. 9RG1
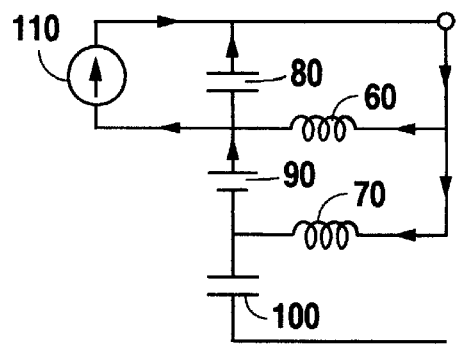
Fig. 9RG2
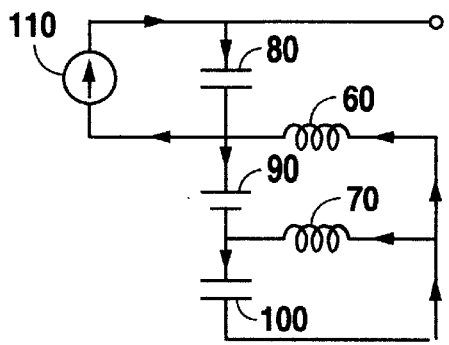
Fig. 9RG3
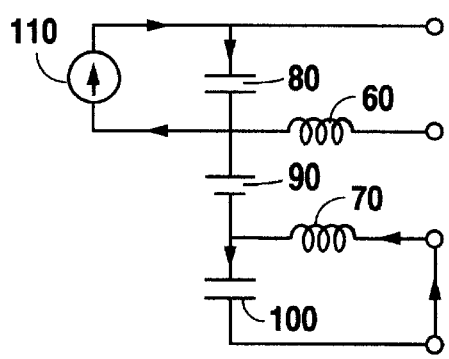
Fig. 9RG4
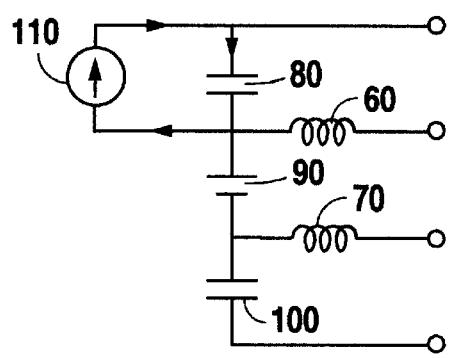
Fig. 9RG5

BI-DIRECTIONAL POWER CONVERSION APPARATUS FOR COMBINATION OF ENERGY SOURCES

BACKGROUND OF THE INVENTION

1. Technical Field

This invention relates generally to methods and apparatus for power conversion, and more particularly, to an apparatus and method for combining the energy available from multiple sources, including those with low total energy content and high power delivery capability, as well as those having high total energy content and low power delivery capability, to supply a single load, and conversely, to transfer power from a single load to multiple, varied energy sources.

2. History of Related Art

Batteries remain the most widely accepted electrical storage devices despite their volume, weight, and life-cycle usage limitations. Designs of both all-electric and hybrid vehicles rely significantly on the availability of advanced battery technology for energy storage. Since battery life depends upon the charge and discharge rates employed during operation, it can be enhanced significantly by maintaining an optimum usage profile. Of course, this also means that the life of a battery can be shortened considerably if the use requirements are such that the battery is charged and discharged rapidly.

To augment battery power, auxiliary energy systems such as ultracapacitors and flywheels are used to deliver (source) or absorb (sink) power in electric vehicle applications, for example, during rapid acceleration and deceleration. Thus, the basic capability of a battery-powered electric vehicle can be enhanced significantly by supplying vehicle peak-power requirements using such auxiliary energy storage systems. Auxiliary systems obviate the need for excessive electrical currents forced into or drawn from the batteries, as may be required during sudden acceleration or deceleration. Further, due to the reduced energy demand on the batteries in these circumstances, auxiliary energy systems bring with them the potential for significant volume and weight reduction, which translates into higher overall energy system efficiency.

Using a battery pack and an auxiliary energy storage system does not solve all of the problems engendered when such power systems are combined to provide power to an electric drive system, for example. If batteries are used as the primary energy source, and ultracapacitor banks are used for peak-power requirements, size and volume constraints typically prohibit the direct connection of the ultracapacitors to the high-voltage vehicle propulsion bus. Further, it may be prohibitively expensive to size an ultracapacitor bank to match the main bus voltage. Hence, some kind of interface is required between the auxiliary storage device (e.g. ultracapacitors) and the battery-powered bus. While combining multiple energy sources can be achieved in a fundamental fashion (i.e., in theory), there is no known, efficient DC/DC power converter topology which enables such a combination in a practical sense. In addition, in the interests of even higher efficiency, is the desired capability to source and sink current from the energy sources onto the power bus, and from the power bus to the energy sources (i.e., the free exchange of power between multiple sources and a load).

There is also a need to reduce the size of the matching components required when interfacing a primary energy source, such as batteries, and a secondary energy source, such as ultracapacitors. As a practical example, ultracapacitors are currently available in modules of 2,700 F, with a maximum allowed working voltage of 2.3 VDC. Considering the typical electric drive motor requirement of approximately 350 VDC, many ultracapacitors are required for a direct match to the power bus. The typical approach to solving this problem includes the use of a DC/DC converter. However, even using enough ultracapacitors to provide a 50 VDC capability requires a step-up ratio of approximately 7:1. The resulting converter requires very large inductors to handle the currents, and large step-up voltage ratio. Such a conventional solution is also very inefficient. The duty cycle (without enabling free power transfer between sources) involves heavy use of the ultracapacitor, or other auxiliary energy source within the power converter, as is well known in the art. Therefore, there is a need for an efficient, bi-directional DC/DC power converter topology which allows the combination of multiple energy sources for operation of a single load. Any desired combination of low-peak energy delivery capability with a large energy content power source (e.g. batteries or fuel cells), or high-peak energy delivery capability with a low energy content power source (e.g., ultracapacitors or flywheels) should be accommodated. Further, such a topology should embody a design which obviates the need for large inductance values in the power conversion circuitry so that a lower voltage step-up/step-down ratio can be maintained. Such a desired topology inherently increases system efficiency by introducing smaller passive components and reducing the weight/volume of the overall system. Finally, as noted above, there is a need for such a topology which permits the free exchange of power among the sources and load, to include the generation and regeneration of power in an assisted fashion such that the individual energy sources maintain a reduced duty cycle. The step-up (boost) and step-down (buck) capability of the needed topology should be maintained irrespective of the direction of power flow.

SUMMARY OF THE INVENTION

The power conversion apparatus of the present invention features bi-directional power flow and step-up/step-down (i.e., boost/buck) capability while combining the power from two independent energy sources to supply a single load using only three active components (an output switch, primary switch, and an auxiliary switch) and two passive components (primary and auxiliary energy storage elements), regardless of the direction of power flow) in its minimal configuration. The output switch is typically coupled to a load of the converter, while the primary energy storage element is coupled between the primary switch and a primary energy source of the converter. The primary switch, primary energy storage element, and primary energy source are in electrical communication with the output switch. The auxiliary energy storage element is coupled between the primary switch and an auxiliary energy source of the converter, such that the auxiliary switch, auxiliary energy storage element, and auxiliary energy source are in electrical communication with the output switch. The primary and secondary energy storage elements may be inductors for coupling voltage sources and capacitors for coupling current sources.

Another embodiment of the bi-directional power converter of the present invention comprises an output switch; at least one of a primary energy storage element coupled between a corresponding primary energy source and primary switch, each of the primary energy storage elements, primary energy sources, and primary switches being in electrical communication with the output switch; and at least one of an auxiliary energy storage element coupled between an auxiliary energy source and an auxiliary switch, each of the auxiliary storage elements, auxiliary energy sources, and auxiliary switches also being in electrical communication with the output switch.

The bi-directional power converter apparatus may operate in several different modes. These include a Non-Assisted Generation (NAG) mode for charging the auxiliary energy source, if required, and capacitances associated with the load from the primary energy source, a Super-Assisted Generation (SAG) mode for supplying power to the load from the primary and auxiliary energy sources, a Super-Assisted Regeneration (SAR) mode for charging the primary and auxiliary energy sources from the load, an Auxiliary Generation (AUXG) mode, typically used for supplying the load from the auxiliary energy source (without substantial assistance from the primary energy source), and an Output Regeneration (OUTR) mode, typically used for regenerating power from the load to the auxiliary energy source without any major assistance from the primary energy source.

In the NAG mode, the power converter includes a means for preventing current flow across the output and auxiliary switches when the primary switch is conducting, so as to source power to the load and the auxiliary energy source from the primary energy source. Further, the converter may include a means for conducting current flow across the output and auxiliary switches when the output, primary, and auxiliary switches are not conducting in this mode.

In the SAG mode, the power converter may include a means for preventing current flow across the output switch when the primary and auxiliary switches are conducting so as to source power from the primary and auxiliary energy sources to the load. The converter, when operating in this mode, may also include a means for conducting current flow across the output and primary switches when the output, primary, and auxiliary switches are not conducting.

When operating in the SAR mode, the power converter includes a means for preventing current flow across the auxiliary switch when the output and primary switches are conducting so as to source power from the load and the primary energy source to the auxiliary energy source. When operating in this mode, the power converter also includes a means for conducting current flow across the primary and auxiliary switches when the output, primary, and auxiliary switches are not conducting.

In the AUXG mode, the power converter includes a means for preventing current flow across the output switch when first the auxiliary switch alone, and then both the auxiliary and primary switches are conducting, so as to source most of the power from the auxiliary energy source to the load and prevent oscillatory current flow through the primary and the auxiliary energy storage elements. Further, when operating in this mode, the converter may include a means for conducting current flow across the output and primary switches when the output, primary, and auxiliary switches are not conducting. Finally, the power converter, when operating in the OUTR mode, includes a means for preventing current flow across the auxiliary switch when first the output switch alone, and then both the output and primary switches are conducting so as to source most of the power from the load to the auxiliary energy source and prevent oscillatory current flow through the primary and auxiliary energy storage elements. Further, when operating in this mode, the power converter may include a means for conducting current flow across the primary and auxiliary switches when the output, primary, and auxiliary switches are not conducting.

The output, primary and auxiliary switches may comprise MOS Field Effect Transistors (MOSFETs), or other power switching devices such as Insulated Gate Bipolar Transistors (IGBTs). Other switches, such as Bipolar Junction Transistors (BJTs) and MOS-Controlled Thyristor (MCTs) can also be used. The means to conduct current across the output, primary, and auxiliary switches usually comprises diodes which are integral to the semiconductor switch construction, such as occurs with an IGBT switch. However, the means used to conduct current may also comprise individual diodes.

The apparatus of the present invention also includes a power conversion system comprising a bi-directional power converter as described above, and a switch controller means in communication with the output, primary, and auxiliary switches. The switch controller means is able to place each of these switches in a conducting or nonconducting mode so as to regulate the magnitude and direction of the current flow through the load, the primary energy source, and the auxiliary energy source.

The present invention includes a method of operating a bi-directional power converter which may comprise the step of sourcing power from an auxiliary energy source to the load while preventing oscillatory current from the load by using a primary energy source to provide a first counteractive current (in the AUXG mode), and may also include the step of sourcing power from the load to the auxiliary energy source while preventing oscillatory current from the auxiliary energy source by using a primary energy source to provide a second counteractive current (in the OUTR mode). The method may also comprise the steps of sourcing power from the primary energy source and the auxiliary energy source to the load (in the SAG mode), sourcing power from the load and the primary energy source to the auxiliary energy source (in the SAR mode), and sourcing power from the primary energy source to the load and the auxiliary energy source (in the NAG mode).

BRIEF DESCRIPTION OF THE DRAWINGS

A more complete understanding of the structure and operation of the present invention may be had by reference to the following detailed description when taken in conjunction with the accompanying drawings, wherein:

FIG. 3 illustrates various states of the present invention during the generation modes of operation;

FIGS. 5A and 5B illustrate the operation of the present invention in the Auxiliary Generation (AUXG) mode;

FIGS. 8A and 8B illustrate the operation of the present invention in the Super-Assisted Regeneration (SAR) mode;

FIG. 9 illustrates various states of the present invention during the regeneration modes of operation;

DETAILED DESCRIPTION OF PRESENTLY PREFERRED EXEMPLARY EMBODIMENTS

Figure 1A:
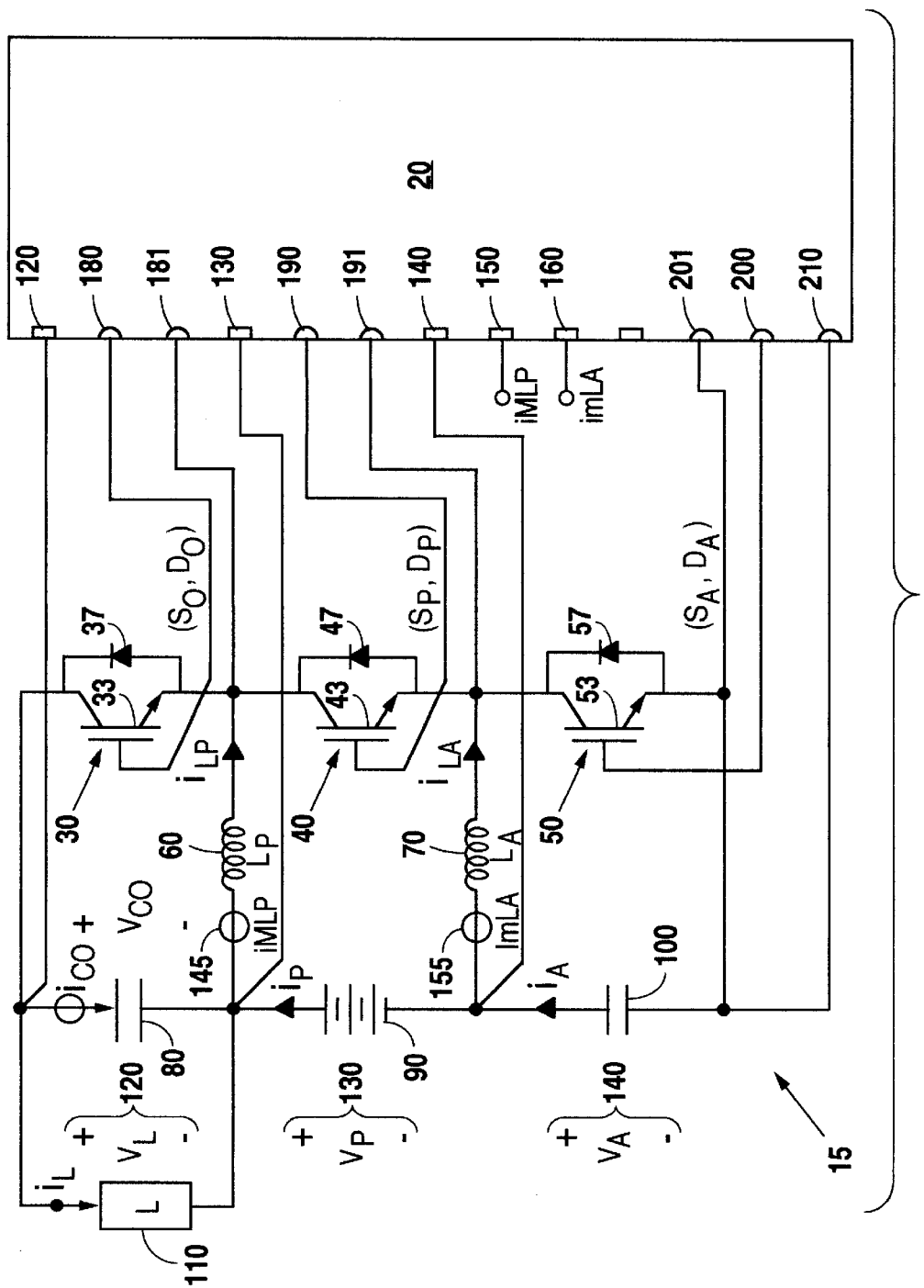
FIG. 1A is a schematic diagram of a minimal implementation of the present invention in its preferred embodiment.

The invention described hereinbelow is useful in any application which requires the maximum, simultaneous utilization of primary and auxiliary energy sources to deliver power to a main bus, such as a propulsion bus. In addition, the invention accommodates energy regeneration and storage. The typical application includes supplying energy to an electric or hybrid electric-powered vehicle, wherein the primary source of energy is a bank of batteries, the auxiliary source of energy is a bank of ultracapacitors or a flywheel, and energy regeneration/storage is obtained through recovery braking.

Turning now to FIG. 1, a schematic diagram of the present invention can be seen. Here the power conversion system 10 is shown to comprise a bi-directional power converter 15 and a switch controller 20.

The bi-directional power converter 15 comprises an output switch 30 which is coupled to a load 110 of the converter 15. The output switch 30 is shown in FIG. 1 as an IGBT 33 combined with a anti-parrallel diode 37. While the output switch 30 is shown as comprising an IGBT/diode, it may also comprise individual components, such as an IGBT, or bipolar junction transistor (BJT) or MOSFET and an anti-parrallel diode in combination, or some other means which provides for the switched control of current through the switch 30 and unidirectional flow of current across the open switch 30, as provided by the anti-parrallel diode 37. A primary energy storage element 60, which may be an inductor, or some component capable of inductive behavior, is coupled between the output switch 30 and a primary energy source 90 of the converter. The power converter 15 also comprises a primary switch 40 (also shown herein as an IGBT and an anti-parrallel diode, but may also consist of an IGBT or BJT or MOSFET 43 and diode 47, as described above), which is coupled to the primary energy storage element 60. An auxiliary energy storage element 70, which may also be an inductor, or some other inductive circuit element, is coupled between the primary switch 40 and an auxiliary energy source 100 of the converter 15.

An auxiliary switch 50 is coupled to the auxiliary energy storage element 70. As is the case for the output and primary switches 30 and 40, the auxiliary switch 50 is also shown as comprising an IGBT and an anti-parrallel diode, but may comprise the separate elements of an IGBT or BJT or MOSFET 53 and an anti-parrallel diode 57, or other components as described above.

The primary energy source 90 in a typical application of the power conversion system 10 comprises a bank of batteries, but may also be any other type of energy source which is typically able to deliver or absorb a high total energy content (i.e. a source of high kWh) but is not capable of high peak-power sourcing or sinking (i.e., not a source of high kW). Other applications may involve a primary energy source of any type, such as a bank of ultracapacitors, a flywheel, or any other energy source which is capable of supplying power to a load, or receiving power for storage. A unidirectional energy source, such as a fuel cell, may be employed as the primary energy source but would require additional load leveling bi-directional energy devices to accommodate reverse power flow. Thus, the invention may be adapted for a uni-directional energy source as the primary energy storage. However, it is most preferably implemented with bidirectional energy storage system As will be described below, the rate of sourcing/sinking power will be determined by the switching activity of the output switch 30, primary switch 40, and auxiliary switch 50.

In a similar fashion, the auxiliary energy source 100 will typically comprise a bank of ultracapacitors, or a flywheel, but may also be any type of energy source which is capable of supplying power to, and receiving power from, a load. For flywheel-based auxiliary energy storage, additional circuitry (e.g., an AC/DC converter) is required which converts the AC energy of the flywheel system to DC energy. Such a bidirectional AC/DC converter is commonly used in the electric drive industry and is well known to those skilled in the art. The auxiliary energy source 100 is typically one that is capable of supplying high peak-power (i.e., a source of high kW), and low energy content storage (i.e., not a source of high kWh). Again, the rate of power sourcing/sinking from the auxiliary energy source 100 is determined by the switching activity of the output, primary, and auxiliary switches 30, 40, and 50.

An output capacitor, also known as the output energy storage element 80, is shown in FIG. 1A as a practical means of sustaining the output voltage ($V_O$) 120 across the load 110.

The switch controller 20 portion of the power conversion system 10 has three outputs and five inputs. The switch controller 20 is in communication with the output, primary, and auxiliary switches, 30, 40, and 50 by means of the output switch controls 180, 181, the primary switch controls 190, 191, and the auxiliary switch controls 200, 201, respectively. Each of the switches 30, 40, and 50 is typically controlled using Pulse Width Modulation (PWM), as is well known in the art. More detail on this type of switching may be found in the book *Power Electronics: Converters, Applications and Design* by Mohan, et al, John Wiley & sons, 1995 and U.S. Pat. No. 4, 736,151, issued to Dishner. Each of these references is incorporated herein by reference in their entirety.

As a means of monitoring the power converter 15 performance and controlling the switches 30, 40, and 50, the switch controller 20 monitors the voltage across the output capacitor $V_{co}$ 120, the voltage across the primary energy source ($V_P$) 130, and the voltage across the auxiliary energy source ($V_A$) 140. In addition, the load 110 and energy sources 90 and 100 are protected by monitoring the measured currents through the primary energy storage element ($i_{mLP}$) 150, and the auxiliary energy storage element ($i_{mLA}$) 160. Monitoring the measured currents ($i_{mLP}$ and $i_{mLA}$) allows derivation of the values for $i_L$, $I_P$, and $i_A$ using conventional network theory techniques. While the turn-on duration of the switches 30, 40, and 50 is based on the error of the measured voltages, the measured currents provide additional protection from exceeding the design limits of the circuit components and energy sources. If the measured currents exceed a predetermined magnitude, the appropriate switches may be turned off to prevent further build-up of current and potential destruction of the circuit.

As noted previously, the primary and auxiliary energy storage elements 60 and 70 may comprise inductors, or other energy storage elements. However, the most preferred elements are inductors when the converter 15 is used primarily to combine or transfer energy with intermediate current energy storage. However, if intermediate voltage energy storage is desired, then the most preferred energy storage elements may be capacitors.

Figure 1C:
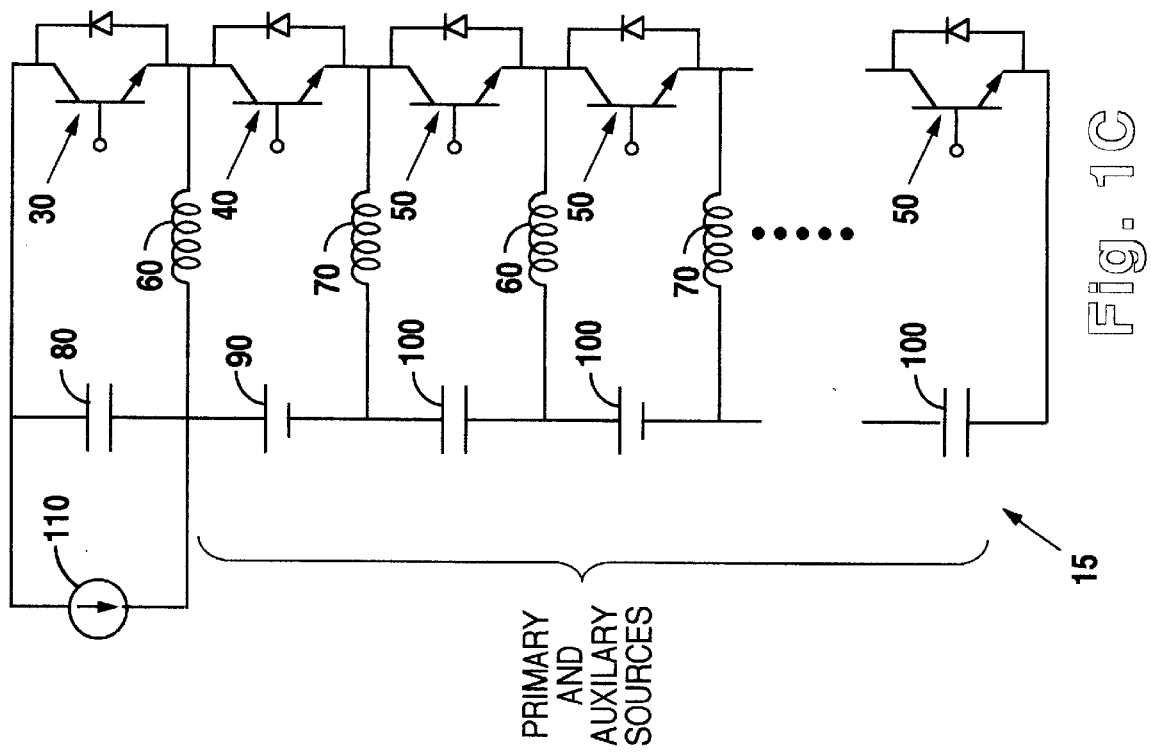
FIG. 1C is a schematic diagram of a generalized version of the preferred embodiment.
Figure 1B:
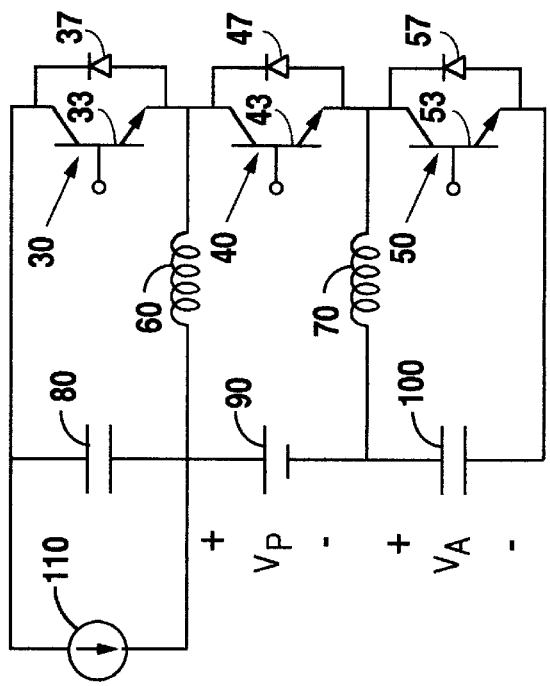
FIG. 1B is a schematic diagram of an alternative embodiment of the present invention.

FIGS. 1B and 1C illustrate alternative embodiments of the bi-directional power converter 15 of the present invention, which may be employed depending upon the desires of the user. FIG. 1B shows the same components as illustrated in FIG. 1A, but the ladder network within the converter 15, comprised of the switches 40 and 50, the energy storage elements 60 and 70, and the energy sources 90 and 100, respectively, shows these components connected in reverse order from that shown in FIG. 1A. That is, while the switches 40 and 50, the energy storage elements 60 and 70, and the energy sources 90 and 100 are all in electrical communication with the output switch 30, they may be transposed along the ladder network that makes up the structure of the converter 15.

FIG. 1C further illustrates the possible circuit configurations enabled by the present invention. The ladder network may also comprise one or more primary energy storage elements 60, coupled between a corresponding one or more primary energy sources 90 and a corresponding one or more primary switches 50. Further, the ladder network may also comprise one or more auxiliary energy storage elements 70, coupled between a corresponding one or more auxiliary energy sources 100 and a corresponding one or more auxiliary switches 50. These "rungs of the ladder" may be arranged in any order, and in any number, provided that the current-carrying capabilities of individual components (energy sources 90 and 100, energy storage elements 60 and 70, and switches 30, 40, and 50) are not exceeded. Typically, the further away such components are located along the "ladder" from the load, the greater the corresponding currents which must be processed.

Figures 2A, 2B:
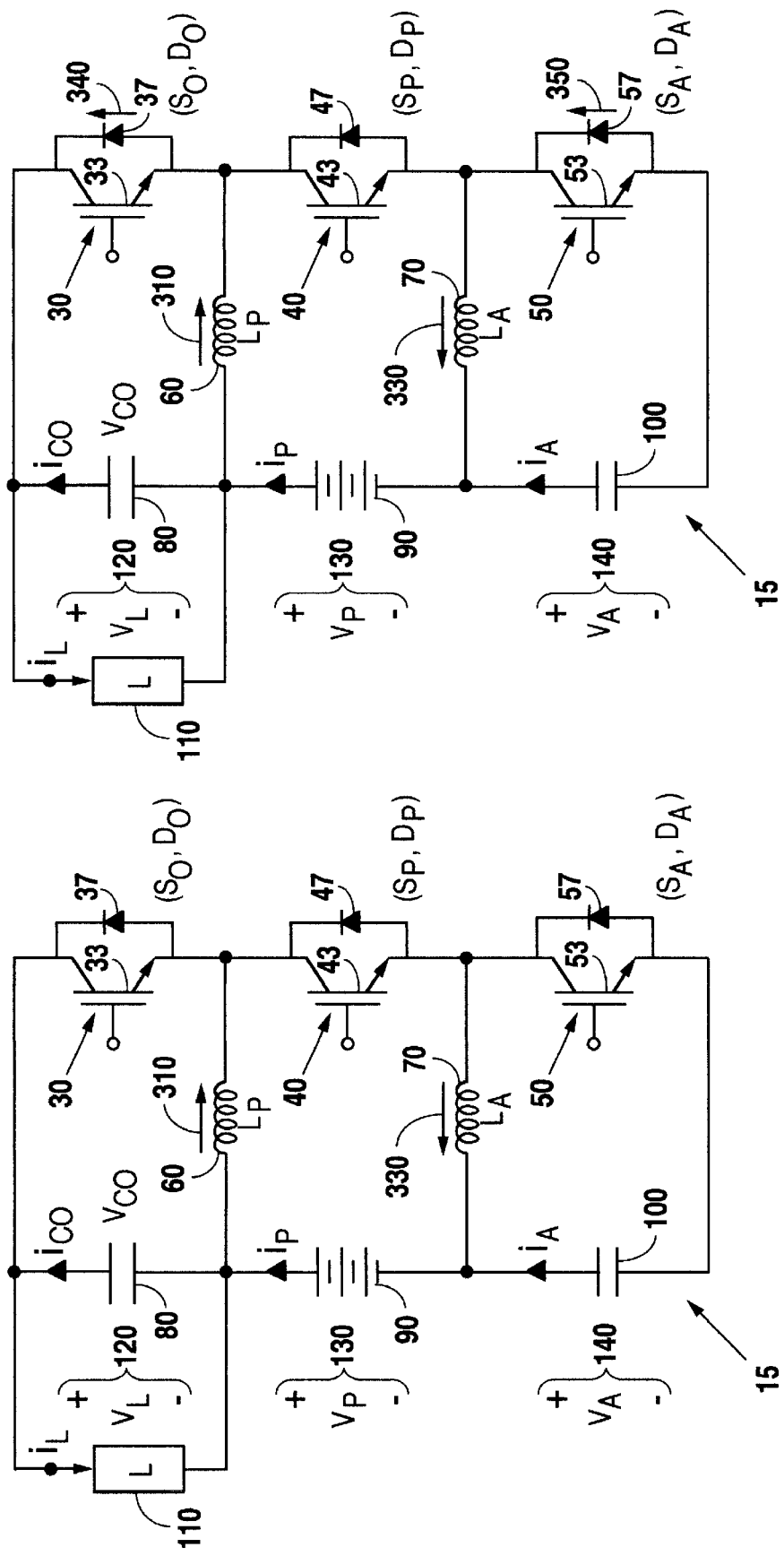
FIGS. 2A and 2B illustrate the present invention operating in the non-assisted generation (NAG) mode.

Turning now to FIGS. 2A and 2B, the first of several operational modes enabled by the present invention can be seen. In this case, the converter 15 is operating in the Non-Assisted Generation (NAG) mode, wherein the primary switch 40 is conducting, and the reverse-biased diodes 37 and 57 prevent current flow across the output and auxiliary switches 30 and 50, as is shown in FIG. 2A. The primary energy source 90 is allowed to source energy into the primary and auxiliary energy storage elements 60 and 70 when the primary switch 40 is conducting. This energy buildup within the primary and auxiliary energy storage elements 60 and 70 is illustrated by the flow of primary energy element current 310, which continues to flow as a primary switch current 320, and as an auxiliary energy element current 330, originating from and returning to the primary energy source 90.

When the primary switch 40 is turned off, the anti-parrallel diodes 37 and 57 allow the stored current energy in the primary and auxiliary energy storage elements 60 and 70 to flow across the output and auxiliary switches 30 and 50, respectively, so as to transfer power from the primary and auxiliary energy storage elements 60 and 70, to the load 110, output capacitor 80, and the auxiliary energy source 100. This is indicated by the flow of auxiliary energy element current 330, which travels through the auxiliary energy storage element 70, the auxiliary energy source 100, and the anti-parrallel diode 57 as an auxiliary diode current 350. In addition, the primary energy element current 310 now flows through the anti-parallel diode 37 as an output diode current 340 and on through the load 110 and the output capacitor 80. This mode is typically used for start-up operation, for example, and allows the transfer of energy from the primary energy source 90 to the auxiliary energy source 100 and the load 110 and output capacitor 80 as a prelude to full system power operation. The NAG mode of operation may also be utilized during regular (i.e., full power) system operation if the power requirement at the load can be satisfied by the primary energy source alone, and the energy content of the auxiliary source is lower than a predetermined minimum level. The energy content for ultracapacitor systems may be determined by measuring the capacitor voltage, whereas for flywheel systems it is determined by the speed of operation.

Assuming continuous current conduction through the primary and auxiliary storage elements 60 and 70, which are illustrated as inductors, during the NAG mode, the various voltages in the circuit are given by:

$$\frac{V_{co}}{V_P} = \frac{D_{NAG}}{1 - D_{NAG}} \left( \frac{L_P}{L_A + L_P} \right) \quad (1)$$

$$\frac{V_A}{V_P} = \frac{D_{NAG}}{1 - D_{NAG}} \left( \frac{L_A}{L_A + L_P} \right) \quad (2)$$

Where $D_{NAG}$ is the switch duty ratio (i.e., the ratio of the switch turn-on time to the total switching cycle time during continuous conduction operation).

From equations (1) and (2), it can be shown that:

$$\frac{V_{co}}{V_A} = \frac{L_P}{L_A} \quad (3)$$

Hence, by establishing an upper limit on the current flowing through the primary energy source, $I_{Pmax}$, while operating the switches at a desired frequency, $f_{sw}$, it can be shown that:

$$I_{P\max} = \frac{V_P D_{NAG}}{(L_P + L_A) f_{sw}} \quad (4)$$

substituting for the voltages $V_{co}$, $V_A$, and $V_P$ and the required $I_{Pmax}$ in (3) and (4), the magnitude of the inductances $L_A$, $L_P$ can be determined.

FIG. 3 illustrates the various conduction states of the circuit in the generation mode of operation, that is, when energy is transferred from the primary energy source 90 alone, or from the auxiliary energy source 100 alone, or from both the primary and auxiliary energy sources 90 and 100 to the load 110 and the output energy storage element 80. In the NAG mode, however, only energy from the primary energy source 90 is transferred to the auxiliary energy source 100, output load 110, and the output energy storage element 80. For simplicity in FIG. 3, the switches and diodes of FIGS. 1 and 2 have been replaced by arrows indicating current flow paths. Those skilled in the art may readily determine those switches and diodes that are conducting current, and those that are blocking current and voltages in this manner.

During operation in the NAG mode, if equation (3) is satisfied, the typical NAG mode operational circuit sequence may be any of the following based upon the duty cycle of operation.

Continuous mode: G7→G6→G7→G6→G7 . . .
Discontinuous mode: G7→G6→G5→G7→G6→G5→G7→ . . .
If, however, equation (3) is not satisfied due to the actual magnitudes of $V_A$ & $V_L$, any of the following operational circuit sequences may be established based upon the duty cycle of operation.
Partial discontinuous mode: G7→G6→G8→G7→G6→G8→G7→ . . .
Discontinuous mode: G7→G6→G8→G5→G7→G6→G8→G5→G7→ . . .

Figure 4B:
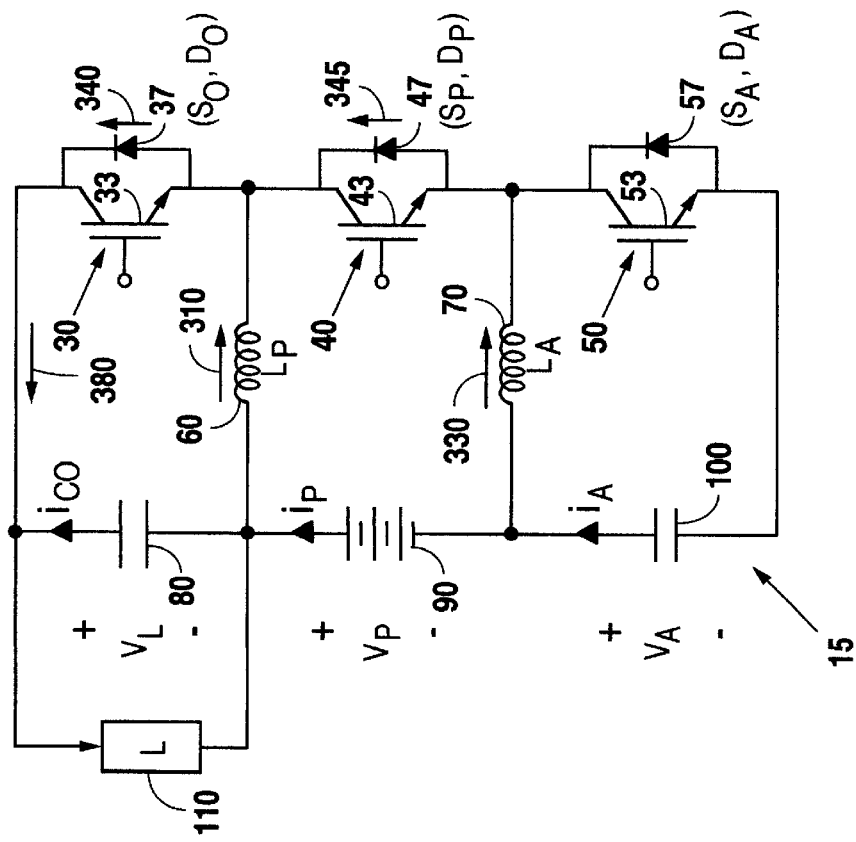
FIGS. 4A and 4B illustrate the operation of the present invention in the Super-Assisted Generation (SAG) mode.
Figure 4A:
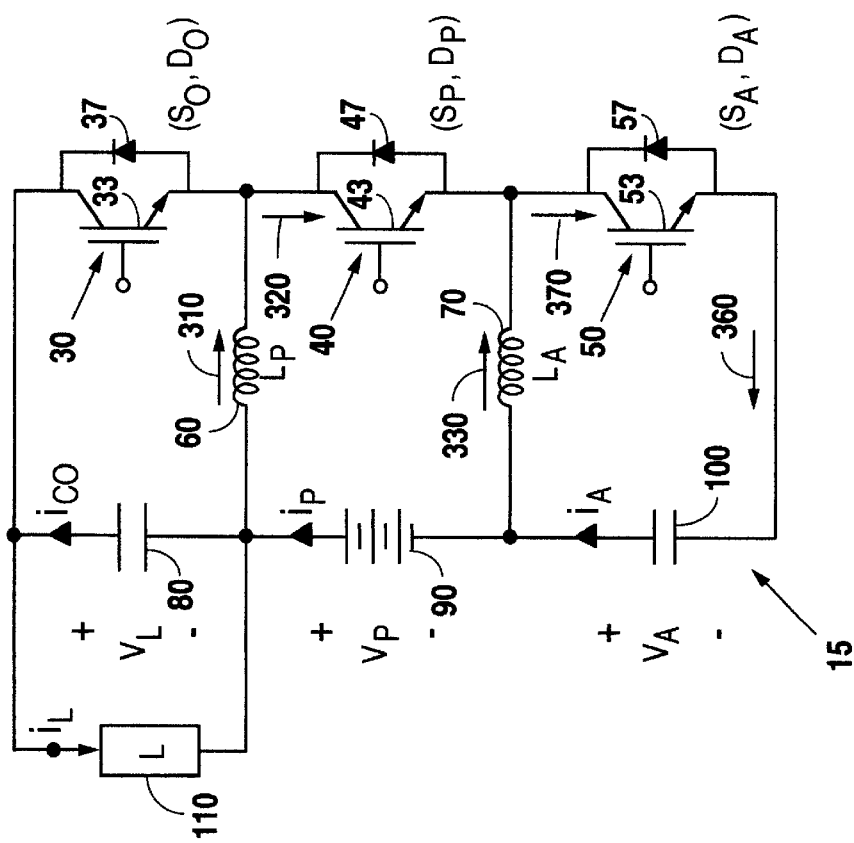

The Super-Assisted Generation (SAG) mode of operation is illustrated in FIGS. 4A and 4B. In this case, the primary and auxiliary switches 40 and 50 are switched on and off simultaneously. This mode is utilized for normal operation of the system, when the auxiliary energy source may also be employed for power generation as determined by the controller. The total power transferred to the load is controlled by the duty cycle of the switches 40 and 50, as is well known to those skilled in the art.

In the SAG mode, the primary and auxiliary switches 40 and 50 are both turned on simultaneously to allow the primary energy element current 310 and auxiliary energy element current 330 to flow through the primary and auxiliary energy storage elements 60 and 70, respectively. As shown in FIG. 4A, the primary energy element current 310 is allowed to flow through the primary switch 40 (conducting) as a primary switch current 320, and the auxiliary energy element current 330 flows through the auxiliary switch 50 (conducting) as a part of the auxiliary switch current 370. The primary energy storage element current 310 makes up the remaining portion of the auxiliary switch current 370. The return current, or auxiliary total current 360, is then passed through the auxiliary energy source 100, which is capable of receiving the entire summed current. However, the primary energy source 90 only receives the current which flows through the primary energy storage element 60 (i.e., the primary energy element current 310). The reverse-biased diode 37 prevents current flow across the output switch 30 when the primary and auxiliary switches 40 and 50 are conducting so as to source power from the primary energy source 90 and the auxiliary energy source 100 to the load 110.

As shown in FIG. 4B, when the output, primary, and auxiliary switches 30, 40, and 50 are not conducting (the primary and auxiliary switches 40 and 50 are turned off simultaneously), the anti-parallel diodes 37 and 47 provide a means for conducting current flow across the output and primary switches 30 and 40. This permits the primary energy element current 310 to flow through the anti-parallel diode 37 as part of the output diode current 340 and the auxiliary energy element current 330 to flow through the anti-parallel diode 47 as primary diode current 345. The total output current 380, flowing into the load 110 and the output capacitor 80, is therefore the sum of the primary energy element current 310 and the auxiliary energy element current 330. Thus, the SAG mode is capable of providing maximum peak-power from the primary and auxiliary energy sources 90 and 100 if demanded by the load.

As illustrated in FIG. 3 and in accord with the description of operation in the previous paragraphs, the SAG mode may consist of one of the following sets of operational circuit state sequences depending upon the duty cycle desired:

Partial discontinuous mode:
G2→G3→G4→G2→G3→G4→G2→ . . .

Discontinuous mode:
G2→G3→G4→G5→G2→G3→G4→G5→G2→ . . .

During normal/full power operation of the circuit, it may be adequate or necessary, as determined by the controller, to transfer power to the load from the auxiliary source as the predominant element. Under these circumstances, the Auxiliary Generation (AUXG) mode is employed, using the primary and auxiliary switches 40 and 50 in a sequential, non-simultaneous, fashion.

The AUXG mode is illustrated in FIGS. 5A and 5B. While most of the power transferred to the load 110 during the AUXG mode is derived from the auxiliary energy source 100, the primary and the auxiliary switches 43, 53 are operated sequentially to prevent uncontrolled energy build-up in the primary and auxiliary energy storage elements 60 and 70, respectively.

Figures 6A, 6B, 6C:
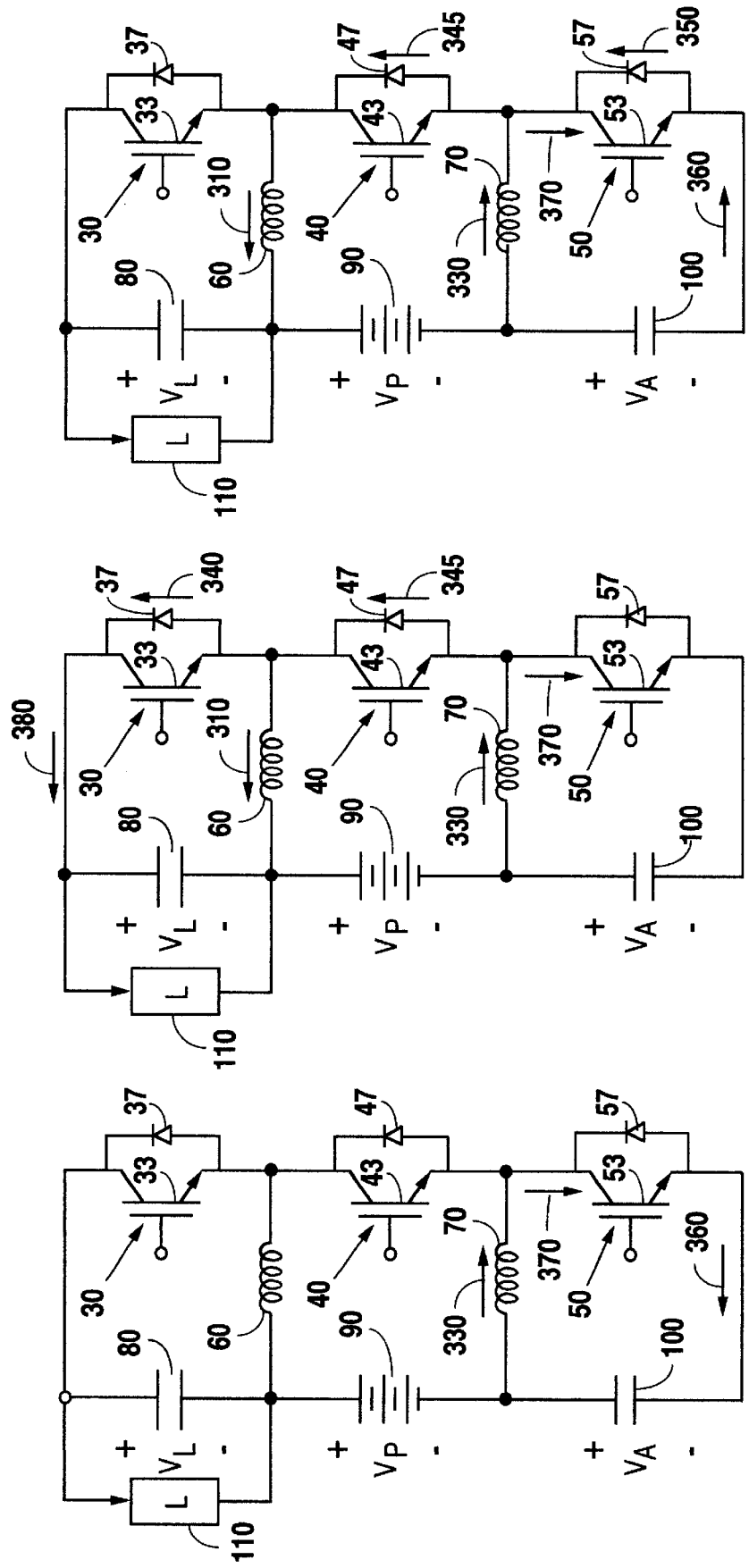
FIGS. 6A, 6B and 6C illustrate the creation of oscillatory parasitic currents in the circuit.

The AUXG mode is initiated by turning on the auxiliary switch 53 alone. This initiates an auxiliary energy storage element current 330, which flows through the auxiliary energy storage element 70 and the auxiliary energy source 100, as shown in FIG. 6A. When the auxiliary switch 53 is turned off, the current energy in the auxiliary storage element 70 flows so as to forward bias the antiparallel diodes 47 and 37 of the primary switch 40 and the output switch 30. As long as the current 340 flows through the diode 37, the diode 37 provides a path for a parasitic current 310 which flows through the output capacitor 80, diode 37, and the primary energy storage element 60. This is illustrated in FIG. 6B. When the current 330 becomes non-existent due to equalization of volt-time area across the auxiliary energy storage element 70, the current 310 supplied by the primary energy storage element 60 finds a path through the primary energy source 90, auxiliary energy source 100 and the anti-parallel diodes 57 and 47 of the auxiliary and primary switches 50 and 40, respectively. Again, as long as the current 350 flows through the anti-parallel diode 57 of the auxiliary switch 50, a path for a parasitic current 330 is provided, and the current 330 flows through the auxiliary energy source 100, auxiliary energy storage element 70, and the auxiliary anti-parallel diode 57. This is shown in FIG. 6C. Upon depletion of the current 310 due to equalization of the volt-time area across the auxiliary energy storage element 70, the parasitic current 330 finds a new current path as shown in FIG. 6B.

Figure 7:
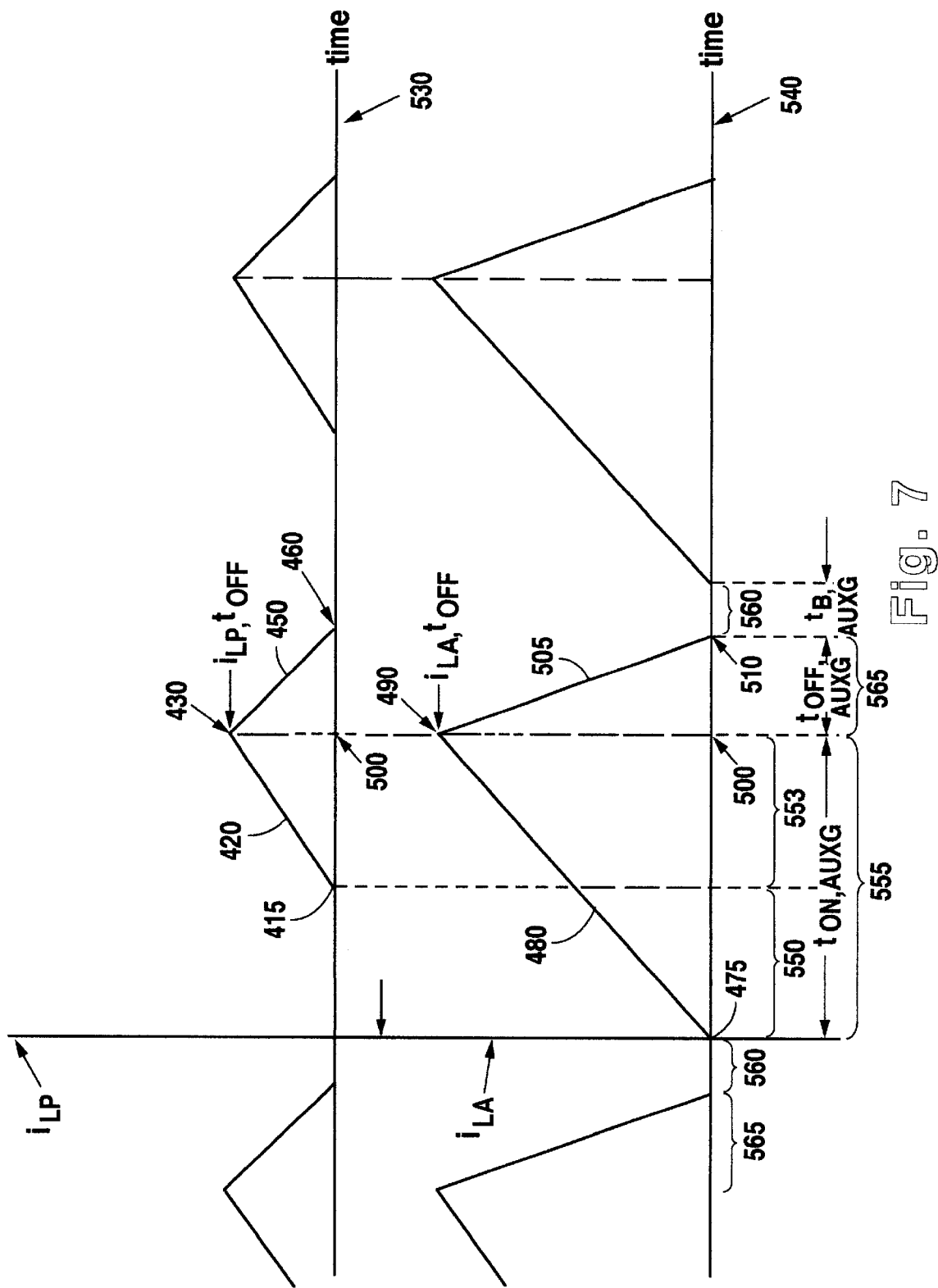
FIG. 7 illustrates graphs of the current flow through the primary and auxiliary energy storage elements of the present invention during AUXG mode operation.

In a loss-less (i.e., ideal) system, such uncontrolled parasitic currents would oscillate indefinitely between the auxiliary energy storage element 70 and the primary energy storage element 60. However, in a real system, the losses associated with real components act to dissipate the oscillatory energy. In the disclosed system, using lossy components, turning on the auxiliary switch 50 alone leads to uncontrolled parasitic currents in the circuit. Hence, the AUXG mode utilizes a particular sequence of switching the auxiliary switch 53 and the primary switch 43 to prevent the build-up of these parasitic currents. FIGS. 5 and 7 show the switching sequence employed during the AUXG mode.

The AUXG mode controller utilizes predictive duty cycle and turn-OFF time estimation to determine the turn-ON activation time 415 for the primary switch 43. As shown in FIG. 7, assume that the controller determines the turn-ON activation time of the auxiliary switch 53 to be at time 475. The determination of the turn-ON activation time 475 and the turn-on duration, $t_{ON\_AUXG}$ 555 happens during the turn-OFF period of the previous switching event. Hence, as illustrated in FIG. 7, the turn-ON calculations occur during the time intervals 565 and 560. Based upon the measured magnitude of the auxiliary source voltage, the turn-OFF duration ($t_{OFF\_AUXG}$), 565 of the auxiliary switch 53 can be calculated using the anticipated turn-ON duration ($t_{ON\_AUXG}$), 555 selected by the controller. In order to prevent the flow of parasitic currents 330 and 310 of FIG. 6, the primary energy storage element 60 needs to conduct a current such that it counters the parasitic current of FIG. 6B. This occurs when element 60 conducts the current 310 shown in FIG. 5A, which requires closure of the primary switch to help build a current flow in the direction of current 310. However, in order to maximize energy transfer from the auxiliary energy source 100 to the load 110, the primary switch turn-ON time 415 is selected such that it minimizes the turn-ON duration 553 of the primary switch 43.

As shown in FIG. 7, the turn-OFF duration ($t_{OFF,AUXG}$) 565 of both the switches 43 and 53, are equal. Hence, an estimate of $t_{OFF,AUXG}$ 565 may be utilized to calculate the peak primary energy storage element current ($i_{LP,tOFF}$) 430 using the measured values of the auxiliary energy source 100 and primary energy source 90 voltages (that is, $V_A$ and $V_P$). Similarly, using volt-time area considerations across the element 60, the turn-ON time 415 of the primary switch 43 can now be calculated. While the calculations occur during the turn-OFF period of the switches (that is, 565 and 560), the switch activation signals for the auxiliary and primary switches 43 and 53 are issued at times 475 and 415, respectively.

The above switching strategy ensures current flow through the primary and auxiliary energy storage elements as shown in FIG. 5 and FIG. 7. This prevents parasitic currents which would otherwise have been created due to operation of the auxiliary switch 53 alone.

Referring to the graph of $i_{LA}$ vs. time 540, the auxiliary switch 53 is turned ON at time 475, illustrated by the rising slope 480 of the current $i_{LA}$ through the auxiliary energy storage element 70. The primary switch 43 is turned ON at time 415, as illustrated by the rising slope 420 of the current $i_{LP}$ through the primary energy storage element 60. During the time interval 553, when both the primary and the auxiliary switches 43 and 53 are conducting, the current 310 through the primary energy storage element 60 and the current 330 through the auxiliary energy storage element 70 flow in the paths illustrated in FIG. 5A.

At time 500, both the primary and the auxiliary switches 43 and 53 are turned OFF. The currents through the primary energy storage element 60 and the auxiliary storage element 70 attain peak magnitudes of $i_{L,tOFF}$ 430 and $i_{LA,tOFF}$ 490, respectively. At turn OFF, the currents through the elements 60 and 70 decreases to zero simultaneously. During the switch turn-OFF period 565, the currents through the elements 60 and 70 flow in the direction indicated in FIG. 5B.

The inactive time period 560 during which no switching occurs may tend toward zero depending upon the selected switching frequency, the turn-ON duration $t_{ON,AUXG}$ 555, and the values of individual circuit elements. If the time period 560 is not zero, then the circuit operates in a totally discontinuous mode of operation, which is characterized by zero current through both the inductors during each switching event. If, on the other hand, the time period 560 equals zero, the circuit operates in a partially discontinuous mode.

As a means of increasing switching cycle speed and conserving energy, it is preferable to match the time instants, 510 and 460 of the current turn OFF times. However, prolonging the conduction time of the primary current (time period 565) allows for inaccuracies in the estimation of the turn-on time 415 of the primary switch 43, further reducing the possibility of allowing any undesirable parasitic currents, such as currents 310 and 330 of FIGS. 6B and 6C, to propagate through the circuit. This may be accomplished by allowing the primary current turn-OFF instant 460 to occur beyond time 510, so as to require an earlier turn ON time 415 of the primary switch 43 (causing the primary source 90 to generate more energy than necessary). It should be noted that delaying the ultimate reduction of the primary current to zero at time 460 may result in decreased switching cycle speed.

Turning back to FIG. 3, the preferred circuit operational sequences for the AUXG mode may be represented as follows:

Partial discontinuous
G1→G2→G3→G1→G2→G3→G1→ . . .

Discontinuous
G1→G2→G3→G5→G1→G2→G3→G5→G1→ . . .

Delayed partial discontinuous
G1→G2→G3→G4→G1→G2→G3→G4→G1→ . . .

Delayed Discontinuous
G1→G2→G3→G4→G5→G1→G2→G3→G4→G5→G1→ . . .

The Super-Assisted Regeneration (SAR) mode is illustrated in FIGS. 8A and 8B. This mode is useful for the efficient recovery of power from the load 110 (e.g., during braking of an electric vehicle). This mode also allows for power recovery when there is more power available for recovery over a short time period than can be easily absorbed by the primary energy source 90 alone.

Thus, as shown in FIG. 8A, the output and primary switches 30 and 40 are turned on simultaneously (they are also shut off simultaneously in the SAR mode) so that the output total current 380, coming from the load 110 and the output capacitor 80 flows through the output switch 30 as output switch current 390, and on through the primary switch 40 as a primary switch current 320. Part of the output total current 380 flows into the primary storage element 60 as a primary energy element current 310, and the remaining portion flows into the auxiliary energy storage element 70 as auxiliary energy element current 330. The diode 57 prevents current flow across the auxiliary switch 50 when the output and primary switches 30 and 40 are conducting, so as to provide for sourcing power from the load 110 to the primary and auxiliary energy sources 90 and 100.

This process continues when the switches 30, 40, and 50 are placed in a non-conducting state (i.e. the output and primary switches 30 and 40 are turned off simultaneously), and diodes 47 and 57 provide a means for conducting current flow across the primary and auxiliary switches 40 and 50. The auxiliary total current 360 flows through the diode 57 and the auxiliary energy storage element 70 as an auxiliary energy element current 330 to provide power to, or charge, the auxiliary energy source 100. The remaining portion of the auxiliary total current 360 flows through the diode 47 as a primary diode current 345, and the primary energy storage element 60 as a primary energy element current 310, so as to source power to, or charge, the primary energy source 90. In this manner, the power exceeding that which can safely be absorbed by the primary energy source 90 is sent on to the auxiliary energy source 100.

FIG. 9 illustrates various conduction states of the circuit during regeneration modes of operation, that is, when energy is transferred from the load 110 and output storage element 80 alone, or the primary energy source 90 alone, or from both the load 110 and output energy storage element 80 and the primary energy storage element 90 to the auxiliary energy source 100. For simplicity, the switches and diodes of FIGS. 1 and 8 have been replaced in FIG. 9 by arrows indicating current flow paths. This representation is similar to the generation modes of operation illustrated in FIG. 3. Those skilled in the art may readily determine those switches and diodes that are conducting current, and those that block currents and voltages, in this manner.

As illustrated in FIG. 9 and in accord with the description of operation, the SAR mode may comprise one of the following sets of operational circuit state sequences, depending upon the duty cycle of operation desired:

Partial discontinuous mode:
RG2→RG3→RG4→RG2→RG3→RG4→RG2→ . . .

Discontinuous mode
RG2→RG3→RG4→RG5→RG2→RG3→RG5→RG2→ . . .

Figures 10A, 10B, 10C:
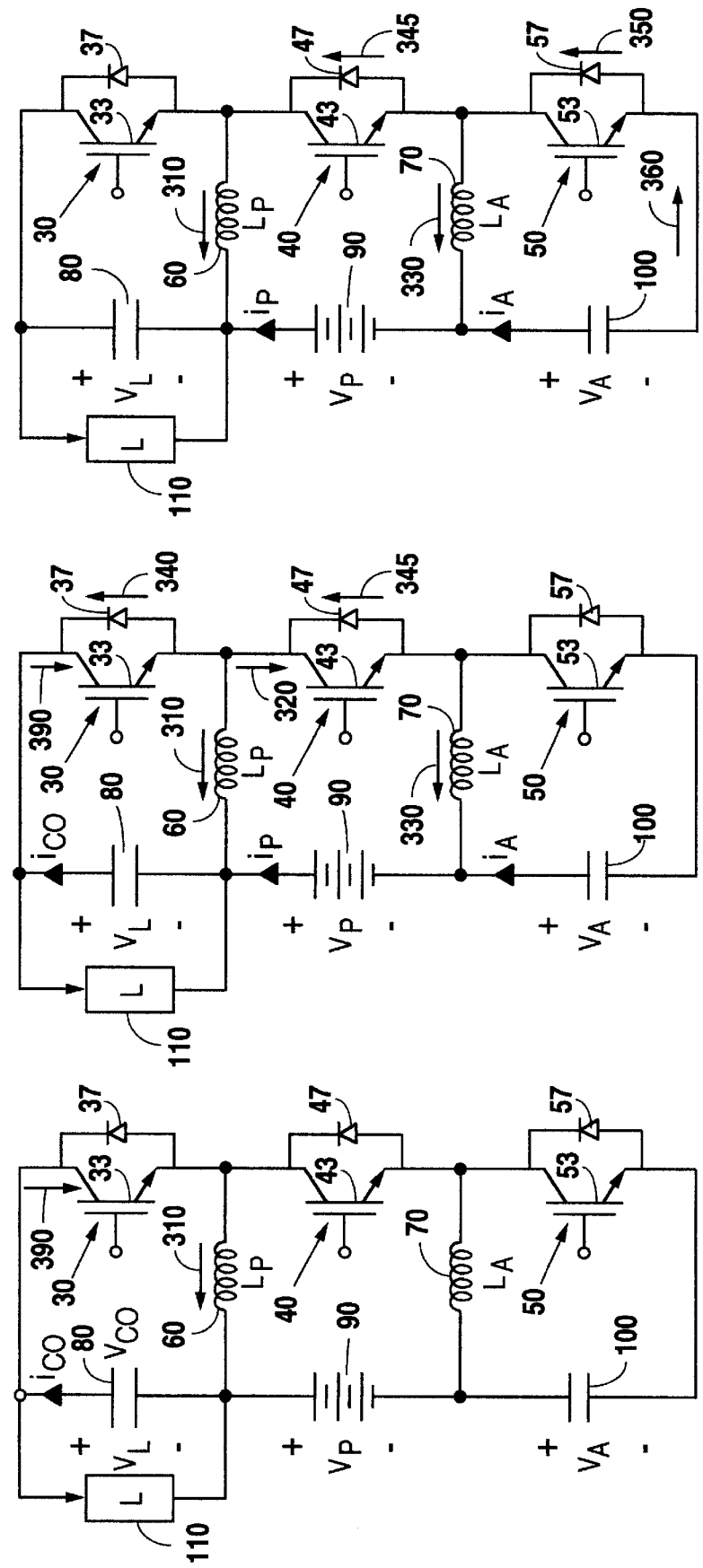
FIGS. 10A, 10B and 10C the current flow through the primary and auxiliary energy storage-elements during the OUTR mode of operation.

The final mode of operation, which is called the Output Regeneration mode (OUTR), is illustrated in FIGS. 10A and 10B. The OUTR mode is most useful for power transfer from the load 110 and output energy storage element 80 into the auxiliary energy source 100. The OUTR mode of operation is the electronic conjugate of the AUXR mode. Hence, regenerated energy from the load 110 and the output energy storage element 80 is stored in the auxiliary energy source 110 without major assistance from the primary energy source 90, unlike the SAR mode of operation. However, similar to the AUXG mode of operation, the OUTR mode has the potential to develop parasitic oscillatory currents in the primary and auxiliary energy storage elements 60 and 70, respectively, if the output switch 33 is activated alone. Parasitic currents develop in a manner similar to that described above for the AUXG mode. In accord with the description of parasitic oscillatory current development during the AUXG mode, those skilled in the art may readily determine an appropriate method to prevent such parasitic oscillatory currents during the OUTR mode. The overall operation and the switching sequence during the OUTR mode is discussed here and illustrated in FIGS. 10 and 11.

While most of the energy transferred to the auxiliary energy source 100 during the OUTR mode is derived from the output load 110 and the output energy storage element 80, the output and the primary switches 33 and 43 are operated sequentially to prevent uncontrolled energy build-up in the primary and auxiliary energy storage elements 60 and 70, respectively.

The OUTR mode is initiated by turning ON the output switch 33 alone. This initiates a primary energy storage element current 310, which flows through the primary energy storage element 60, the output load 110, and the output energy storage element 80, as shown in FIG. 10A. In order to prevent oscillatory parasitic currents during the OUTR mode operation, a particular sequence of switching the output switch 33 and the primary switch 43 is utilized. The OUTR mode controller makes use of predictive duty cycle and turn-OFF time estimation to determine the turn-On activation time 815 for the primary switch 43.

Figure 11:
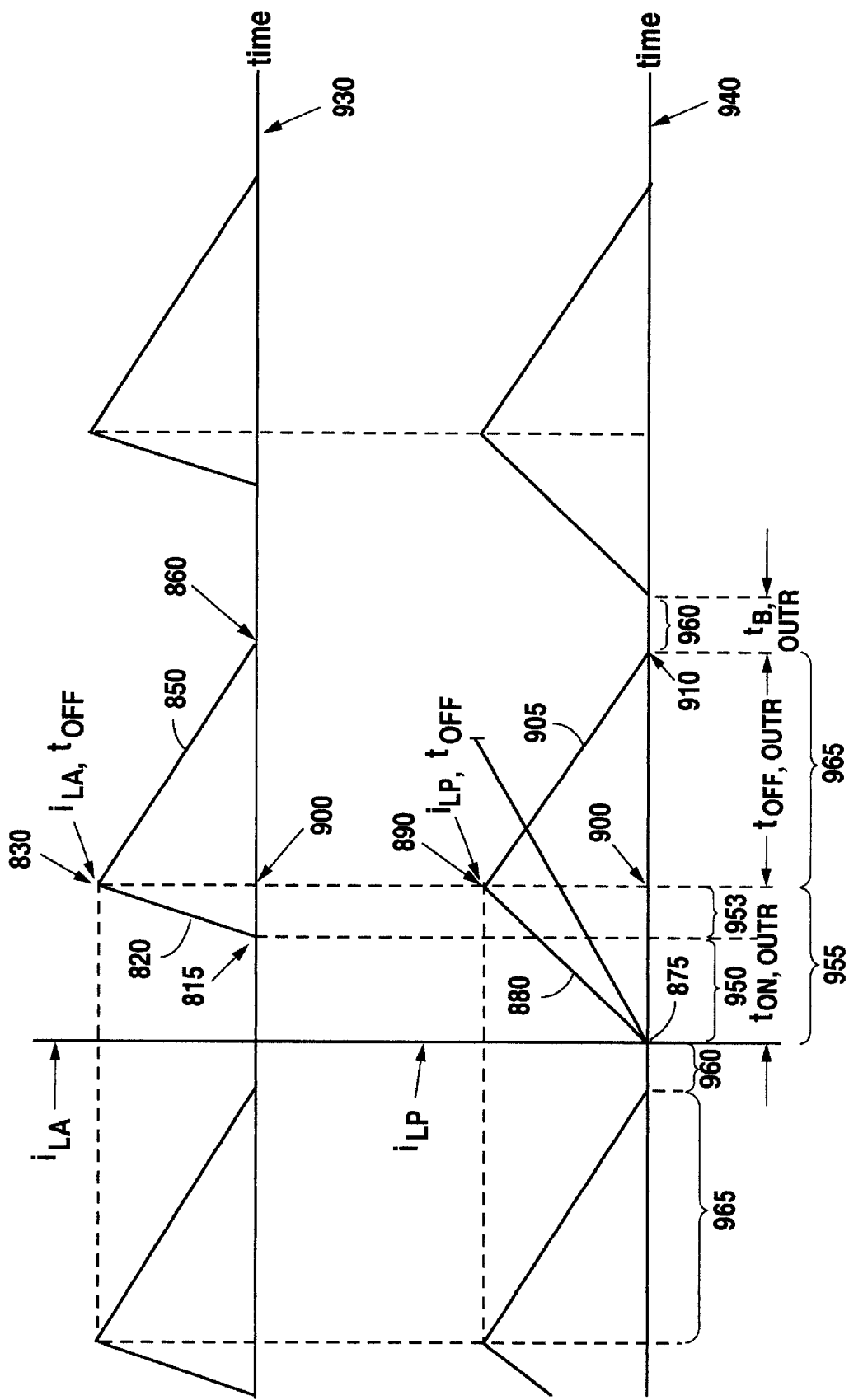
FIG. 11 illustrates graphs of the current flow through the primary and auxiliary energy storage elements of the present invention during the OUTR mode of operation.

Referring now to FIG. 11, assume the controller determines the turn-ON activation time of the output switch 33 to be at time 875. The determination of the turn-ON activation time 875 and the turn-ON duration $t_{ON,OUTR}$ 955 happens during the turn-OFF period of the previous switching event. Hence, as illustrated in FIG. 11, the turn-ON calculations occur during the time intervals 965 and 960. Based upon the measured magnitude of the output load or the output energy storage element 80 voltage, the turn-OFF duration ($t_{OFF,OUTR}$) 965 of the output switch 33 can be calculated using the anticipated turn-ON duration ($t_{ON,OUTR}$) 955 selected by the controller. In order to prevent the flow of parasitic currents, the auxiliary energy storage element 70 needs to conduct a current such that it counters the parasitic current. This occurs when element 70 conducts the current 330 shown in FIG. 10B, which requires closure of the primary switch 43 to help build a current flow in the direction of current 330. However, in order to maximize energy transfer from the output load 110 and the output storage element 80 to the auxiliary source 100, the primary switch turn-ON time 815 should be selected to minimize the turn-ON time 953 of the primary switch 43.

As shown in FIG. 11, the turn-OFF duration ($t_{OFF,OUTR}$) 965 of both the switches 43 and 33 are equal. Hence, an estimate of $t_{OFF,OUTR}$ 965 may be utilized to calculate the peak auxiliary energy storage current ($i_{LA},t_{OFF}$) 830 using the measured voltage values across the primary energy source 90 and the output energy storage element 80 (that is, $V_P$ and $V_{co}$). Utilizing volt-time area considerations across element 70, the turn-ON time 815 of the primary switch 43 can now be calculated. While the calculations occur during the turn-OFF period of the switches (that is, 965 and 960), the switch activation signals for the output and primary switches are issued at times 975 and 815 respectively.

This switching strategy ensures current flow through the primary and auxiliary storage elements 60 and 70, shown in FIGS. 10 and 11. This prevents parasitic currents which may otherwise have been created due to operation of the output switch 33 alone.

Referring to the graph of $i_{LP}$ vs. time 940, the output switch 33 is turned-ON at time 875, illustrated by the rising slope 880 of the current $i_{LP}$ through the primary energy storage element 60. The primary switch 43 is turned ON at time 815, as illustrated by the rising slope 820 of the current $i_{LA}$ through the auxiliary energy storage element 70. During the time interval 953, when both the output and the primary switch 33 and 43 are conducting, the current 310 through the primary energy storage element 60 and the current 330 through the auxiliary energy storage element 70 flow in the paths illustrated in FIG. 10B.

At time 900, both the output and primary switches 33 and 43 are turned OFF. The currents through the primary energy storage element 60 and the auxiliary energy storage element 70 attain peak magnitudes of $i_{LP},t_{OFF}$ 890 and $i_{LA},t_{OFF}$ 830, respectively. At turn-OFF, the currents through the elements 60 and 70 decrease to zero simultaneously. During the switch turn-OFF period 965, the currents through the elements 60 and 70 flow in the direction shown in FIG. 10C.

As in the AUXG mode, the inactive period 960 during which no switching occurs may tend toward zero depending upon the selected switching frequency, the turn-ON duration, $t_{ON,OUTR}$ 955, and the values of individual circuit elements. If the time period 960 is not zero, then the circuit operates in a totally discontinuous mode of operation, which is characterized by zero current through both energy storage elements 60 and 70 during each switching event. If, on the other hand, the time period 960 equals zero, the circuit operates in a partially discontinuous mode.

As a means of increasing switching cycle speed and conserving energy, it is preferable to match the time instants, 910 and 860 of the current turn-OFF times. However, prolonging conduction time of the auxiliary current (time period 965) allows for inaccuracies in the estimation of the turn-On time 815 of the primary switch 43, reducing the possibility of allowing undesirable parasitic currents to propagate through the circuit. This may be accomplished by allowing the auxiliary current turn-OFF instant 860 to occur beyond time 910, so as to ensure an earlier turn-ON time 815 of the primary switch 43 (causing the primary source 90 to generate more energy than necessary). It should be noted that delaying the ultimate reduction of auxiliary current to zero at time 960 may result in decreased switching cycle speed.

Referring back to FIG. 9, the circuit operational sequences for the OUTR mode may be represented as follows:

Partial discontinuous:
RG1→RG2→RG3→RG1→RG2→RG3→RG1→ . . .
Discontinuous:
RG1→RG2→RG3→RG5→RG1→RG2→RG3→RG5→RG1→ . . .
Delayed partial discontinuous:
RG1→RG2→RG3→RG4→RG1→RG2→RG3→RG4→RG1→ . . .

Delayed discontinuous:
RG1→RG2→RG3→RG4→RG5→RG1→RG2→RG3→RG4→RG5→RG1→ . . .

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A bi-directional power converter adapted to source power to a load in parallel with an output energy storage element, comprising:
    an output switch electrically coupled to the load and the output energy storage element;
    a primary energy storage element electrically coupled between a primary energy source and a primary switch, the primary energy storage element being electrically coupled to the output energy storage element and the output switch; and
    an auxiliary energy storage element electrically coupled between an auxiliary energy source and an auxiliary switch, the auxiliary energy storage element being electrically coupled to the primary energy source and the primary switch.

2. The power converter of claim 1, wherein the primary and secondary energy storage elements are inductors.

3. The power converter of claim 1, further including a means for preventing current flow across the output switch and the auxiliary switch when the primary switch is conducting so as to source power to the load and the auxiliary energy source from the primary energy source.

4. The power converter of claim 3, further including a means for conducting current flow across the output switch and the auxiliary switch when the output, primary, and auxiliary switches are not conducting.

5. The power converter of claim 4, wherein the means for conducting current flow across the output switch is an anti-parallel diode, and wherein the means for conducting current flow across the auxiliary switch is an anti-parallel diode.

6. The power converter of claim 1, wherein the means for preventing current flow across the output switch is an anti-parallel diode, and wherein the means for preventing current flow across the auxiliary switch is an anti-parallel diode.

7. The power converter of claim 1, further including a means for preventing current flow across the output switch when the primary switch and the auxiliary switch are conducting so as to source power from the primary energy source and the auxiliary energy source to the load.

8. The power converter of claim 7, further including a means for conducting current flow across the output switch and the primary switch when the output, primary, and auxiliary switches are not conducting.

9. The power converter of claim 1, further including a means for preventing current flow across the auxiliary switch when the output switch and the primary switch are conducting so as to source power from the load and the primary energy source to the auxiliary energy source.

10. The power converter of claim 9, further including a means for conducting current flow across the primary switch and the auxiliary switch when the output, primary, and auxiliary switches are not conducting.

11. The power converter of claim 1, further including a means for preventing current flow across the output switch when the primary switch and the auxiliary switch are conducting so as to source power from the auxiliary energy source to the load and prevent oscillatory current flow through the primary and auxiliary energy storage elements.

12. The power converter of claim 11, including a means for conducting current flow across the output switch and the primary switch when the output, primary, and auxiliary switches are not conducting.

13. The power converter of claim 1, including a means for preventing current flow across the auxiliary switch when the output switch and the primary switch are conducting so as to source power from the load to the auxiliary energy source and prevent oscillatory current flow through the primary and auxiliary energy storage elements.

14. The power converter of claim 13, including a means for conducting current flow across the primary switch and the auxiliary switch when the output, primary, and auxiliary switches are not conducting.

15. A bi-directional power converter adapted to source power to a load in parallel with an output energy storage element, comprising:
    an output switch electrically coupled to the load and the output energy storage element;
    a plurality of primary energy storage elements, wherein each one of the plurality of primary energy storage elements is electrically coupled between a corresponding primary energy source and a corresponding primary switch, wherein at least one of the plurality of primary energy storage elements is electrically coupled to the output energy storage element and the output switch; and
    an auxiliary energy storage element electrically coupled between an auxiliary energy source and an auxiliary switch, the auxiliary energy storage element being electrically coupled to a selected one of the corresponding primary energy sources and a selected one of the corresponding primary switches.

16. A bi-directional power converter adapted to source power to a load in parallel with an output energy storage element, comprising:
    an output switch electrically coupled to the load and the output energy storage element;
    an auxiliary energy storage element electrically coupled between an auxiliary energy source and an auxiliary switch, the auxiliary energy storage element being electrically coupled to the output energy storage element and the output switch; and
    a primary energy storage element electrically coupled between a primary energy source and a primary switch, the primary energy storage element being electrically coupled to the auxiliary energy source and the auxiliary switch.

17. A bi-directional power converter adapted to source power to a load in parallel with an output energy storage element, comprising:
    an output switch electrically coupled to the load and the output energy storage element;
    a plurality of auxiliary energy storage elements, wherein each one of the plurality of auxiliary energy storage elements is electrically coupled between a corresponding auxiliary energy source and a corresponding auxiliary switch, wherein at least one of the plurality of auxiliary energy storage elements is electrically coupled to the output energy storage element and the output switch; and a primary energy storage element electrically coupled between a primary energy source and a primary switch, the primary energy storage element being electrically coupled to a selected one of the corresponding auxiliary energy sources and a selected one of the corresponding auxiliary switches.

18. A bi-directional power conversion system adapted to source power to a load in parallel with an output energy storage element, comprising:

a bi-directional power converter comprising an output switch electrically coupled to the load and the output energy storage element; a primary energy storage element electrically coupled between a primary energy source and a primary switch, the primary energy storage element being electrically coupled to the output energy storage element and the output switch; and an auxiliary energy storage element electrically coupled between an auxiliary energy source and an auxiliary switch, the auxiliary energy storage element being electrically coupled to the primary energy source and the primary switch; and a switch controller means in electrical communication with the output, primary, and auxiliary switches.

19. A method of operating a bi-directional power converter connected to a load having an energy requirement, wherein the bi-directional power converter comprises an output switch electrically coupled to the load and an output energy storage element, a primary energy storage element electrically coupled between a primary energy source and a primary switch, the primary energy storage element being electrically coupled to the output energy storage element and the output switch, and an auxiliary energy storage element electrically coupled between an auxiliary energy source and an auxiliary switch, the auxiliary energy storage element being electrically coupled to the primary energy source and the primary switch, wherein the auxiliary energy source provides power to the load, and wherein a first counteractive current is provided to the primary energy storage element to prevent oscillatory currents within the load, comprising the steps of:

turning on the auxiliary switch for a first period of time determined by the energy requirement to provide an auxiliary current from the auxiliary energy source to the auxiliary energy storage element;

turning on the primary switch at a first switching instant to provide a first counteractive current from the primary energy source and the auxiliary energy storage element to the primary energy storage element, wherein the primary energy source has a primary voltage magnitude, wherein the auxiliary energy source has an auxiliary voltage magnitude, and wherein the first switching instant is determined by the primary and auxiliary voltage magnitudes and the first period of time; and turning off the primary switch so that the first counteractive current within the primary energy storage element exists for as long as the auxiliary current exists within the auxiliary energy storage element.

20. The method of claim 19, wherein the load has an energy surplus and provides power to the auxiliary energy source, and wherein a second counteractive current is provided to the primary energy storage element to prevent oscillatory currents within the auxiliary energy source, further comprising the steps of:

turning on the output switch for a second period of time determined by the energy surplus to provide a primary current from the output energy storage element to the primary energy storage element;

turning on the primary switch at a second switching instant to provide a second counteractive current from the primary energy source and the output energy storage element to the auxiliary energy storage element, wherein the primary energy source has a second output voltage magnitude, wherein the output energy source has a second output voltage magnitude, and wherein the second switching instant is determined by the second primary and output voltage magnitudes and the second period of time; and turning off the primary switch so that the second counteractive current within the auxiliary energy storage element exists for as long as the primary current exists within the primary energy storage element.

21. A method of operating a bi-directional power converter connected to a load having an energy surplus, wherein the bi-directional power converter comprises an output switch electrically coupled to the load and an output energy storage element, a primary energy storage element electrically coupled between a primary energy source and a primary switch, the primary energy storage element being electrically coupled to the output energy storage element and the output switch, and an auxiliary energy storage element electrically coupled between an auxiliary energy source and an auxiliary switch, the auxiliary energy storage element being electrically coupled to the primary energy source and the primary switch, wherein the load provides power to the auxiliary energy source, and wherein a first counteractive current is provided to the primary energy storage element to prevent oscillatory currents within the auxiliary energy source, comprising the steps of:

turning on the output switch for a period of time determined by the energy surplus to provide a primary current from the output energy storage element to the primary energy storage element;

turning on the primary switch at a switching instant to provide a first counteractive current from the primary energy source and the output energy storage element to the auxiliary energy storage element, wherein the primary energy source has a primary voltage magnitude, wherein the output energy source has an output voltage magnitude, and wherein the switching instant is determined by the primary and output voltage magnitudes and the period of time; and turning off the primary switch so that the first counteractive current within the auxiliary energy storage element exists for as long as the primary current exists within the primary energy storage element.

22. A method of operating a bi-directional power converter connected to a load having an energy requirement, wherein the bi-directional power converter comprises an output switch electrically coupled to the load and an output energy storage element, a primary energy storage element electrically coupled between a primary energy source and a primary switch, the primary energy storage element being electrically coupled to the output energy storage element and the output switch, and an auxiliary energy storage element electrically coupled between an auxiliary energy source and an auxiliary switch, the auxiliary energy storage element being electrically coupled to the primary energy source and the primary switch, wherein the output, auxiliary, and primary switches each include a parallel diode, and wherein the primary and auxiliary energy sources provide power to the load, comprising the steps of:

turning on the primary and auxiliary switches for a period of time determined by the energy requirement so as to store energy in the primary storage element and the auxiliary storage element; and waiting for the energy stored in the primary and auxiliary storage elements to propagate through the parallel diodes into the output storage element in the form of an output current from the primary and auxiliary storage elements.

23. The method of claim 22, wherein the output energy source has an output voltage, the primary energy source has a primary voltage, and the auxiliary energy source has an auxiliary voltage, further comprising the step of:

adjusting the period of time to vary the ratio of the output voltage to the primary voltage and the ratio of the output voltage to the auxiliary voltage.

24. A method of operating a bi-directional power converter connected to a load having an energy requirement, wherein the bi-directional power converter comprises an output switch electrically coupled to the load and an output energy storage element, a primary energy storage element electrically coupled between a primary energy source and a primary switch, the primary energy storage element being electrically coupled to the output energy storage element and the output switch, and an auxiliary energy storage element electrically coupled between an auxiliary energy source and an auxiliary switch, the auxiliary energy storage element being electrically coupled to the primary energy source and the primary switch, wherein the output, auxiliary, and primary switches each include an anti-parallel diode, and wherein the primary energy source provides power to the load and the auxiliary energy source, comprising the steps of:

turning on the primary switch for a period of time determined by the energy requirement so as to store energy in the primary storage element and the auxiliary energy storage element; and waiting for the energy stored in the primary and auxiliary energy storage elements to propagate through the anti-parallel diodes into the output storage element in the form of an output current from the primary and auxiliary energy storage elements.

25. The method of claim 24, wherein the output energy source has an output voltage and the primary energy source has a primary voltage, firer comprising the step of:

adjusting the period of time to vary the ratio of the output voltage to the primary voltage.

* * * * *